United States Patent
Brown

(10) Patent No.: US 7,835,401 B2
(45) Date of Patent: Nov. 16, 2010

(54) SYSTEM AND METHOD FOR INVERSE MULTIPLEXING USING TRANSCODING AND FRAME ALIGNMENT MARKERS

(75) Inventor: Matthew Brown, Kinburn (CA)

(73) Assignee: Applied Micro Circuits Corporation, San Diego, CA (US)

( * ) Notice: Subject to any disclaimer, the term of this patent is extended or adjusted under 35 U.S.C. 154(b) by 166 days.

(21) Appl. No.: 12/388,128

(22) Filed: Feb. 18, 2009

(65) Prior Publication Data

US 2010/0208753 A1 Aug. 19, 2010

(51) Int. Cl.
*H04J 1/02* (2006.01)

(52) U.S. Cl. ...................... 370/488; 375/308

(58) Field of Classification Search ............... 370/465, 370/466, 488, 527; 375/308, 329
See application file for complete search history.

(56) References Cited

U.S. PATENT DOCUMENTS 5,008,900 A * 4/1991 Critchlow et al. ........... 370/488
2010/0037059 A1 * 2/2010 Sun et al. .................... 713/176
2010/0131830 A1 * 5/2010 Brown et al. ................ 714/776

* cited by examiner

*Primary Examiner*—Ricky Ngo
*Assistant Examiner*—Phuongchau B Nguyen
(74) *Attorney, Agent, or Firm*—Law Office of Gerald Maliszewski; Gerald Maliszewski

(57) ABSTRACT

A system and method are provided for framing messages in a data streams encoded with redundant information for transmission and recovering the messages at a receiver. The transmission method accepts an energy waveform representing N words at a first bit rate, encoded with redundant information, where each word includes P number of bits. The N words are transformed, creating N transcoded words, where each transcoded word includes Q number of bits, and where Q<P. The N transcoded words are mapped into M lanes in a buffer memory, where M>1 and each lane receives a frame of N/M transcoded words. A frame alignment marker is generated and mapped into each frame. Each frame is represented as an energy waveform that is transmitted on a corresponding physical lane at the first bit rate divided by M.

20 Claims, 7 Drawing Sheets

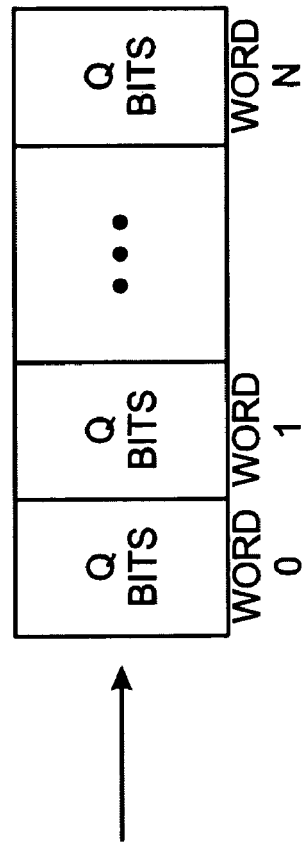
Fig. 2
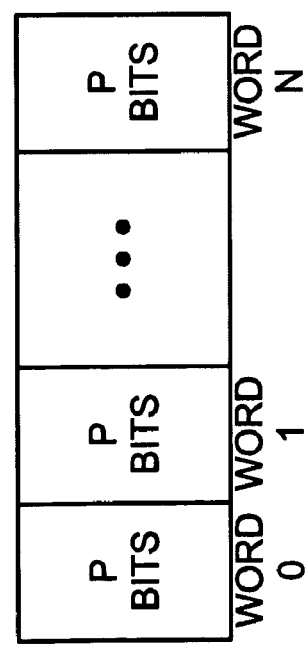
Fig. 3
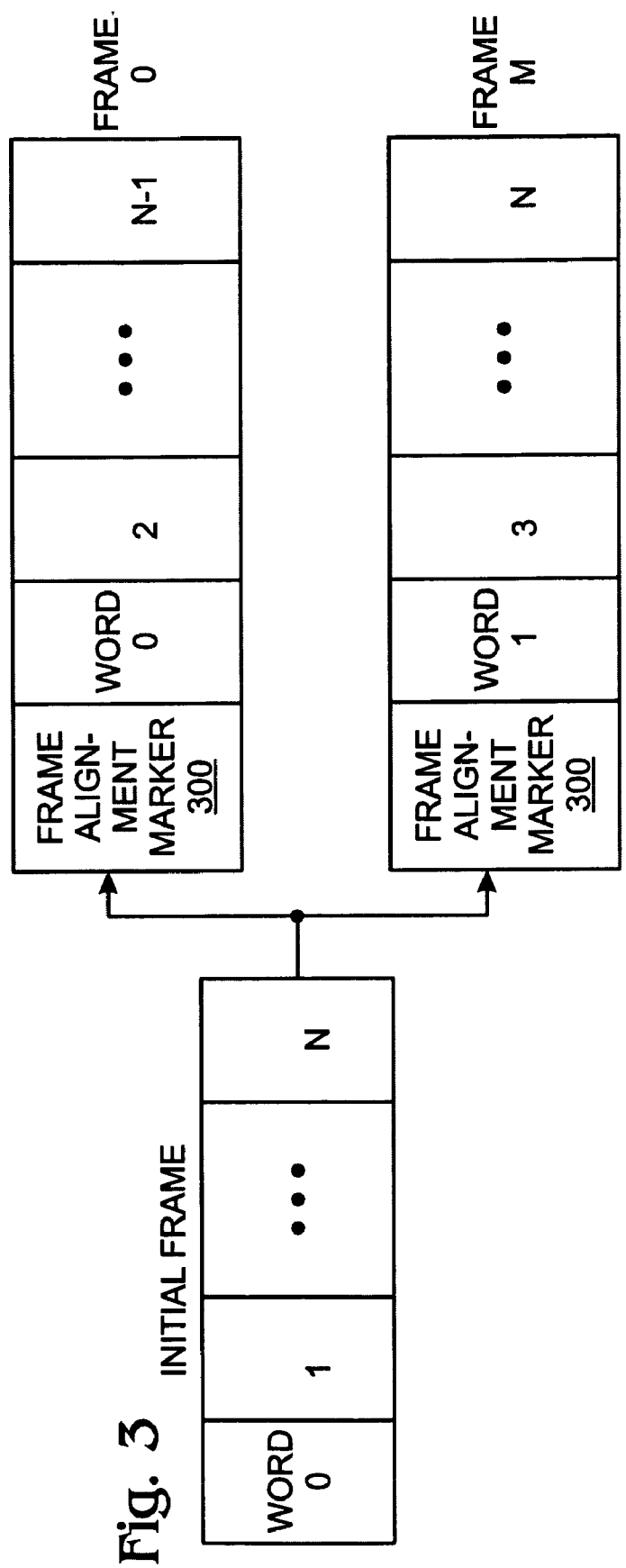

Fig. 5A

| | |
|---|---|
| D{N+14,0:63} | D{N+14,0:63} |
| T{N+14,1} | T{N+14,1} |
| C{7} | C{7} |
| D{N+12,0:63} | D{N+12,0:63} |
| T{N+12,1} | T{N+12,1} |
| C{6} | C{6} |
| D{N+10,0:63} | D{N+10,0:63} |
| T{N+10,1} | T{N+10,1} |
| C{5} | C{5} |
| D{N+8,0:63} | D{N+8,0:63} |
| T{N+8,1} | T{N+8,1} |
| C{4} | C{4} |
| D{N+6,0:63} | D{N+6,0:63} |
| T{N+6,1} | T{N+6,1} |
| C{3} | C{3} |
| D{N+4,0:63} | D{N+4,0:63} |
| T{N+4,1} | T{N+4,1} |
| C{2} | C{2} |
| D{N+2,0:63} | D{N+2,0:63} |
| T{N+2,1} | T{N+2,1} |
| C{1} | C{1} |
| D{N,0:63} | D{N,0:63} |
| T{N,1} | T{N,1} |
| C{0} | C{0} |
| RXO LANE 0 MULTI-FRAME | RXO LANE 1 MULTI-FRAME |

Fig. 5B

| | |
|---|---|
| D{N+14,0:63} | D{N+14,0:63} |
| T{N+14,1} | T{N+14,1} |
| D{N+12,0:63} | D{N+12,0:63} |
| T{N+12,1} | T{N+12,1} |
| C{3,0:1} | C{3,0:1} |
| D{N+10,0:63} | D{N+10,0:63} |
| T{N+10,1} | T{N+10,1} |
| D{N+8,0:63} | D{N+8,0:63} |
| T{N+8,1} | T{N+8,1} |
| C{2,0:1} | C{2,0:1} |
| D{N+6,0:63} | D{N+6,0:63} |
| T{N+6,1} | T{N+6,1} |
| D{N+4,0:63} | D{N+4,0:63} |
| T{N+4,1} | T{N+4,1} |
| C{1,0:1} | C{1,0:1} |
| D{N+2,0:63} | D{N+2,0:63} |
| T{N+2,1} | T{N+2,1} |
| D{N,0:63} | D{N,0:63} |
| T{N,1} | T{N,1} |
| C{0,0:1} | C{0,0:1} |
| RXO LANE 0 MULTI-FRAME | RXO LANE 1 MULTI-FRAME |

Fig. 5C

| | |
|---|---|
| D{N+14,0:63} | D{N+14,0:63} |
| T{N+14,1} | T{N+14,1} |
| D{N+12,0:63} | D{N+12,0:63} |
| T{N+12,1} | T{N+12,1} |
| D{N+10,0:63} | D{N+10,0:63} |
| T{N+10,1} | T{N+10,1} |
| D{N+8,0:63} | D{N+8,0:63} |
| T{N+8,1} | T{N+8,1} |
| C{1,0:3} | C{1,0:3} |
| D{N+6,0:63} | D{N+6,0:63} |
| T{N+6,1} | T{N+6,1} |
| D{N+4,0:63} | D{N+4,0:63} |
| T{N+4,1} | T{N+4,1} |
| D{N+2,0:63} | D{N+2,0:63} |
| T{N+2,1} | T{N+2,1} |
| D{N,0:63} | D{N,0:63} |
| T{N,1} | T{N,1} |
| C{0,0:3} | C{0,0:3} |
| RXO LANE 0 MULTI-FRAME | RXO LANE 1 MULTI-FRAME |

Fig. 6A

| | |
|---|---|
| D{N+2,0:63} | D{N+2,0:63} |
| T{N+2,1} | T{N+2,1} |
| D{N,0:63} | D{N,0:63} |
| T{N,1} | T{N,1} |
| C{0,0:1} | C{0,0:1} |
| RXO LANE 0 MULTI-FRAME | RXO LANE 1 MULTI-FRAME |

Fig. 6B

| | |
|---|---|
| D{N+6,0:63} | D{N+6,0:63} |
| T{N+6,1} | T{N+6,1} |
| D{N+4,0:63} | D{N+4,0:63} |
| T{N+4,1} | T{N+4,1} |
| D{N+2,0:63} | D{N+2,0:63} |
| T{N+2,1} | T{N+2,1} |
| D{N,0:63} | D{N,0:63} |
| T{N,1} | T{N,1} |
| C{0,0:3} | C{0,0:3} |
| RXO LANE 0 MULTI-FRAME | RXO LANE 1 MULTI-FRAME |

| | |
|---|---|
| D{N+14,0:63} | D{N+14,0:63} |
| T{N+14,1} | T{N+14,1} |
| D{N+12,0:63} | D{N+12,0:63} |
| T{N+12,1} | T{N+12,1} |
| D{N+10,0:63} | D{N+10,0:63} |
| T{N+10,1} | T{N+10,1} |
| D{N+8,0:63} | D{N+8,0:63} |
| T{N+8,1} | T{N+8,1} |
| D{N+6,0:63} | D{N+6,0:63} |
| T{N+6,1} | T{N+6,1} |
| D{N+4,0:63} | D{N+4,0:63} |
| T{N+4,1} | T{N+4,1} |
| D{N+2,0:63} | D{N+2,0:63} |
| T{N+2,1} | T{N+2,1} |
| D{N,0:63} | D{N,0:63} |
| T{N,1} | T{N,1} |
| C{0,0:7} | C{0,0:7} |
| RXO LANE 0 MULTI-FRAME | RXO LANE 1 MULTI-FRAME |

US 7,835,401 B2

SYSTEM AND METHOD FOR INVERSE MULTIPLEXING USING TRANSCODING AND FRAME ALIGNMENT MARKERS

BACKGROUND OF THE INVENTION

1. Field of the Invention

This invention generally relates to digital communications and, more particularly, to a system and method for interleaving and disinterleaving frames of words using frame alignment markers created from transcoding the words.

2. Description of the Related Art

Ethernet messages, either octets of data or control information, are redundantly encoded for the purpose of maintaining DC balance, which is also referred to as running disparity (RD), and ensuring sufficient edge density. 8 B/10 B is a common RD-encoded format. 8-bit symbols are mapped into 10-bit symbols, coded to provide a sufficient number of state changes to permit clock recovery from the data stream and to ensure DC balance. 8 B/10 B coding is used in applications such as PCI Express, IEEE 1394b, Fibre Channel, Gigabit Ethernet, InfiniBand, and XAUI to name but a few. 64 B/66 B is a similar format where 64 symbols are mapped into a 66-bit word. Using a system that controls long-term DC-balance and edge density permits a data stream to be transmitted through a channel with a high-pass characteristic, and to be recovered with conventional clock and data recovery (CDR) units.

More explicitly, 64 B/66 B is encoded with 2 extra bits per 64 data bits, to detect the start of a 66-bit block. Two bits are used to provide a sufficiently unique value to find the start of a block. To maintain DC balance the value is either 10 or 01. 01 indicates that the block is data, and 10 indicates that the block is control. However, if start of block is known, only one bit is required to identify control versus data type.

IEEE 802.3ba is a recent standard for 40 G (40 gigabit per second) Ethernet. Connections between devices on the same board may be achieved using the XLAUI, which uses 4 lanes of 10 G. Current interface technology in some applications (e.g., FPGA) does not support 10 G rates. A means to send data at a lower rate by using more lanes is required.

One solution to the above-mentioned problem would be to disinterleave a single high-speed physical lane into parallel physical lanes. Such an arrangement would permit backward compatibility, and permit the parallel lanes to be operated at a lower data rate. Further, the buffering requirement would be reduced. However, as presently devised, there are an insufficient number of frame alignment markers for disinterleaving a single lane into multiple lanes. Without frame alignment markers in each lane, the disinterleaved frames are difficult to recover.

IEEE 802.3ba explicitly supports 40 G with 4 lanes of 10 G each. However, there is not an explicit way to disinterleave one of the 4 lanes into two 5 G lanes compatible with current systems. Without frame alignment markers, such 5 G lanes cannot be re-interleaved at the receive side, especially if there is a temporal skew resulting from buffering at the Tx, differences in the lengths of the signal carrying media, or buffering at the Rx.

It would be advantageous if a frame of information in a redundantly encoded message format, such as 64 B/66 B, could be disinterleaved into parallel frames with their own frame alignment markers, and transmitted at the same (combined) rate as the original frame, without excessive latency and buffering requirements.

SUMMARY OF THE INVENTION

The invention disclosed herein resolves the above-mentioned problems and avoids others by retaining the same line rate as the input signal, and retaining the use of the frequency dependent components in the link. The throughput rate of the data is maintained without losing any information. Latency is also minimized by disinterleaving a single large frame into smaller ones, with a combined data rate equal to the single large frame.

Accordingly, a method is provided for disinterleaving and framing messages in a data streams encoded with redundant information in a communications transmitter. The method accepts an energy waveform representing N words at a first bit rate, encoded with redundant information, where each word includes P number of bits. The N words are transformed, creating N transcoded words, where each transcoded word includes Q number of bits, and where Q<P. The N transcoded words are mapped into M lanes in a buffer memory, where M>1 and each lane receives a frame of N/M transcoded words. A frame alignment marker is generated and mapped into each frame. Each frame is represented as an energy waveform that is transmitted on a corresponding physical lane at the first bit rate divided by M.

The "extra" (P−Q)·N bits generated by the transcoding process are used to create the frame alignment markers. A frame alignment marker of (N/M)·(Q−P) bits is created for each frame. The frame alignment marker can be mapping into each frame as an S·(Q−P)-bit word interposed between every Sth word in the frame. Thus, a single bit frame alignment word may be inserted between each transcoded word in a frame, or a 2-bit frame alignment word can inserted between every-other transcoded word, to name a couple of examples. Alternately, the frame alignment marker can be a single word of (N/M)·(Q−P) consecutive bits.

A method is also provided for re-interleaving messages from multiple physical lanes in a communications receiver. The method receives energy waveforms representing M frames, via M corresponding physical lanes at a combined first bit rate, where M>1. A frame alignment marker is detected in each frame, where each frame includes N/M words of Q bits each. M frames are mapped into a single frame of N words in a buffer memory. The N words are transformed into N transcoded words of P bits, where Q<P. The N transcoded words are supplied as an energy waveform representing the N transcoded words at a first bit rate.

Additional details of the above-described methods, and systems for framing data streams encoded with redundant information, and re-interleaving the frames at the receiver, are provided below.

BRIEF DESCRIPTION OF THE DRAWINGS

FIG. 2 is a diagram depicting the N words, before and after being transcoded.

FIG. 3 is a diagram depicting the N transformed words being mapped into M frames.

FIGS. 5A through 5C depict some examples of frame alignment marker mapping in a system of M=2 physical lanes.

FIGS. 6A through 6C are examples of a simple framing process where all the frame alignment information is mapped into a single word of consecutive bits.

FIG. 7 is a flowchart illustrating a method for disinterleaving and framing messages in a data streams encoded with redundant information in a communications transmitter.

DETAILED DESCRIPTION

Figure 1:
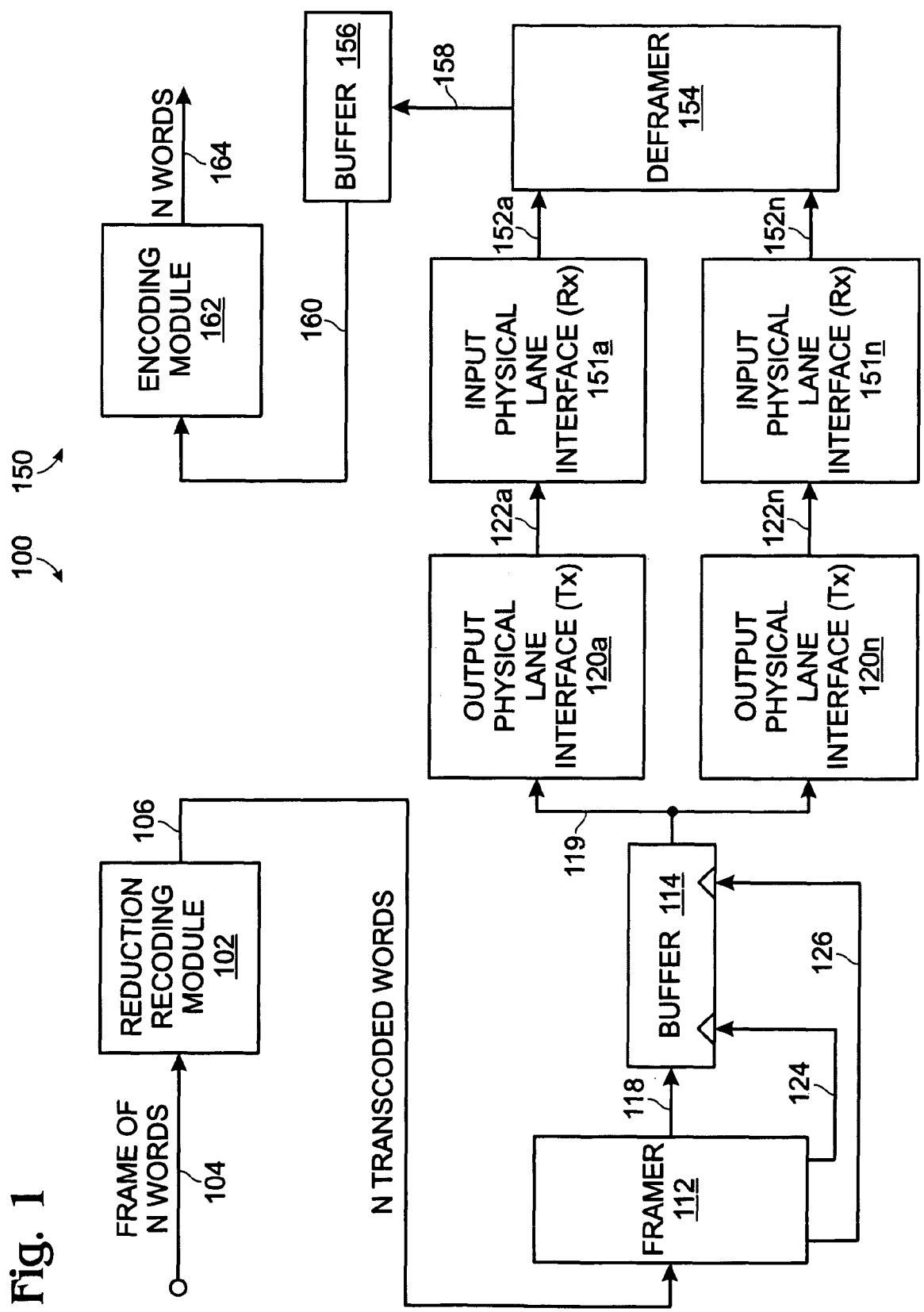
FIG. 1 is a schematic block diagram depicting a system for framing messages in a data stream encoded with redundant information.

FIG. 1 is a schematic block diagram depicting a system for framing messages in a data stream encoded with redundant information. The system 100 comprises a reduction recoding module having an input on line 104 to accept an energy waveform representing N words at a first bit rate, encoded with redundant information. For example, line 104 may be connected to an upper level (e.g., a media access control (MAC) level) device (not shown). Each word includes P number of bits. In another aspect, line 104 may be connected to the output of an IEEE 802.3ba compliant receiver.

The reduction recoding module 102 transforms the N words and supplies N transcoded words at an output on line 106. Each transcoded word includes Q number of bits, where Q<P. In other words, the transcoding process removes redundant information from the original words, leaving information or a control sequence. For example, the redundant information may have been inserted into a data word for the purpose of block delineation or signal conditioning. Note: the transformation process need not necessarily remove all redundant information from a word.

A framer 112 has an input on line 106 to accept the N transcoded words. The framer 112 maps the N transcoded words into M lanes, where M is a variable greater than 1 and each lane receives a frame of N/M transcoded words. Alternately stated, the framer maps the N transcoded words into M frames, where each frame is associated with a unique physical lane interface. The framer 112 generates a frame alignment marker for each frame and maps a frame alignment marker into each frame.

A buffer memory 114 has an input to accept the mapped frames on line 118 and an output to supply M frames on line 119. As shown, the framer controls ingress in, and egress out of the buffer using lines 124 and 126, respectively. M physical lane interfaces 120 are shown. Explicitly, physical lane interfaces 120a through 120n are shown. Although the variable n is equal to 2 in this example, the value of n is not limited to any particular value. The physical lane interfaces may represent different communication mediums, and/or different transmitters. Each physical lane interface 120 has an input on line 119 to accept a frame from the buffer memory 114, and output on line 122 to supply an energy waveform representing the frame at the first bit rate divided by M. In another variation not shown, the framer and reduction recoding module are a combined unit that simultaneously transcodes words while framing into the M frames (M physical lanes). Likewise, the framer may perform the buffering function in some aspects not shown.

FIG. 2 is a diagram depicting the N words, before and after being transcoded. Shown is a frame of N words, where N is not limited to any particular value. Each word in the initial single frame is comprised of P bits. After transformation, each word is comprised of Q bits. A total of N·(P–Q) bits are removed from each frame by the transformation process. The values of P and Q are not limited to any particular value, except that Q<P.

FIG. 3 is a diagram depicting the N transformed words being mapped into M frames. A frame alignment marker 300 is inserted into each frame. The "extra" (P–Q)·N bits generated by the transcoding process are used to create the frame alignment markers 300. Thus, the framer generates each frame alignment marker with (N/M)·(Q–P) bits. Although the frame alignment markers are shown located at the beginning of the frame, they are not limited to any particular frame location. In this example, the framer maps N transcoded words into 2 lanes (M=2), where each lane receives a frame of N/2 transcoded words. If one redundant bit is stripped from each word, then N·(P–Q)/2 bits are available for the frame alignment marker in each frame.

Figure 4:
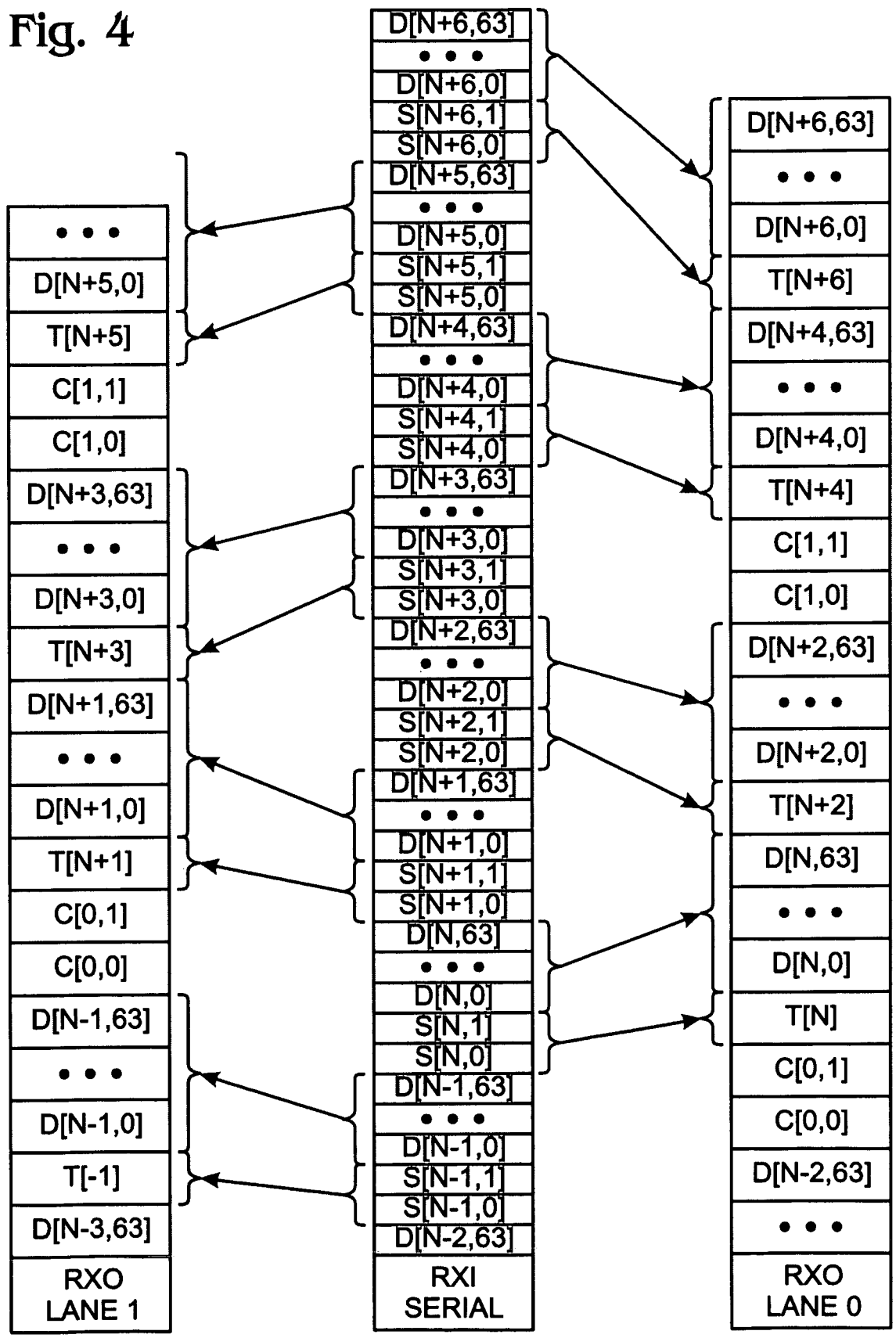
FIG. 4 is a diagram depicting the transformation and disinterleaving of 66-bit redundantly encoded words into two physical lanes (M=2).

FIG. 4 is a diagram depicting the transformation and disinterleaving of 66-bit redundantly encoded words into two physical lanes (M=2). Shown is an input serial steam (RXI) with words (N–1) through (N+5). Word (N–1) includes 2 redundant bits S[0] and S[1]. For example, these 2 bits might be used for overhead (OH) synchronization. One of these bits is disinterleaved into (RXO) lane 1 and used as OH (T[–1]). Then, data bits 0 through 63 D[0 through 63] are disinterleaved into lane 1, and the "extra" redundant bit (C[0,0]) created by transcoding is used for frame alignment. In the same manner, word N is transformed and disinterleaved into RXO lane 0. Note: in lane 1, the frame alignment bit from word (N–1) is mapped adjacent the frame alignment bit from word (N+1), making a 2-bit frame alignment word.

FIGS. 5A through 5C depict some examples of frame alignment marker mapping in a system of M=2 physical lanes. In one aspect as shown, the framer maps the frame alignment marker as:

an S·(Q–P)-bit word; and, where that word is interposed between every Sth word in the frame.

Thus in FIG. 5A, a single bit frame alignment word is inserted between each transcoded word in the frame. Note: in this example, N 66-bit words are transformed into N 65-bit words, with 64 bits of information (D(0:63)) and an additional redundant bit (T(1)). That is, P=66, Q=65, and S=1. In FIG. 5B a 2-bit frame alignment word is inserted between every-other transcoded word (P=66, Q=65, and S=2). In FIG. 5C a 4-bit frame alignment word is inserted between 4th transcoded word (P=66, Q=65, and S=4). Note: in other variations not shown, the frame alignment markers may be mapped in an asymmetrical pattern within the frame.

In another aspect, the framer generates a frame alignment marker with a fixed-bit value pattern that permits easy byte alignment. Alternately, the pattern may be a sequence of predefined bit values, or a counting sequence pattern. For example, the counting sequence may increment in consecutive frames. Many incrementing patterns are possible, such as incrementing by 1, decrementing by 1, and incrementing or decrementing by a fixed value, to name but a few examples. Using FIG. 5C as an example, each 4-bit frame alignment word may be a fixed-bit pattern of all "1" bits. Alternately, the frame alignment words may be a sequence of predefined bit values, where only 1 bit changes state at each increment (e.g., a gray code).

Figures 6C, 7:
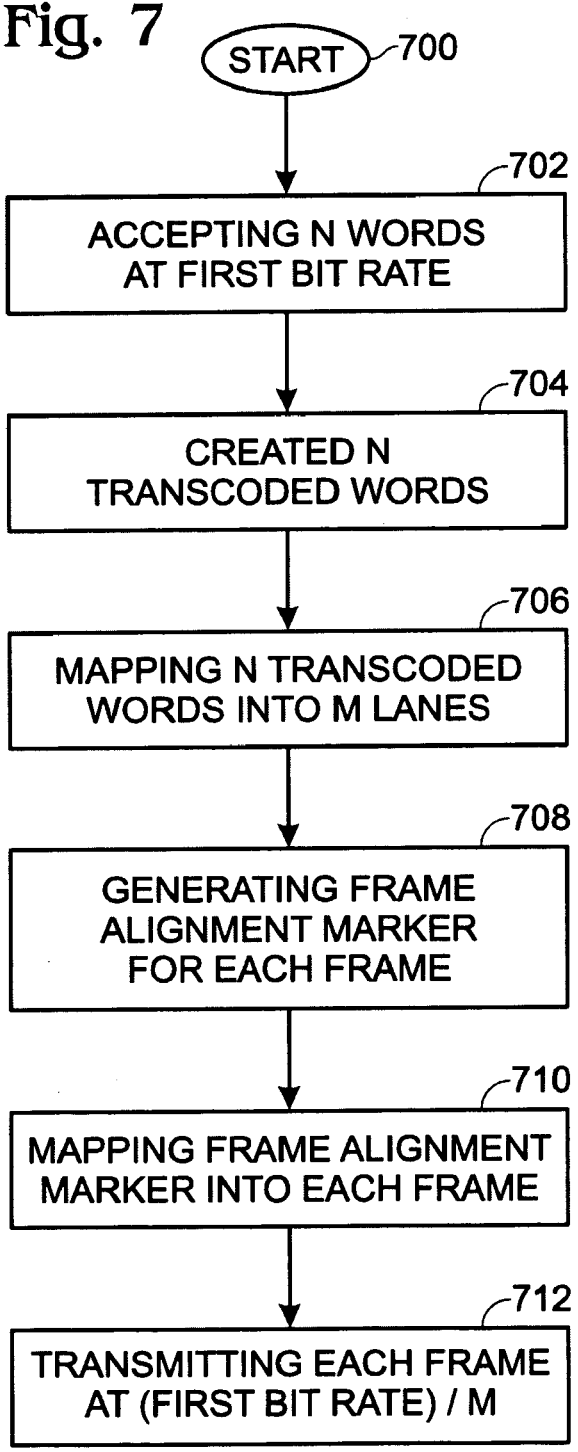

FIGS. 6A through 6C are examples of a simple framing process where all the frame alignment information is mapped into a single word of consecutive bits. These examples describe a system of two physical lanes (M=2), with P=66 and Q=65. In FIG. 6A, 2-bit frame alignment marker is inserted into the beginning of each frame, followed by 2 transcoded words. In FIG. 6B, a 4-bit frame alignment marker is inserted into the beginning of each frame, followed by 4 transcoded words. In FIG. 6C, an 8-bit frame alignment marker is inserted into the beginning of each frame, followed by 8 transcoded words. In other variations not shown, the frame alignment marker may be inserted in the middle of the frame, between transcoded words, or at the end of the frame.

Returning to FIG. 1, a complete communications network also includes a system 150 for re-interleaving messages in multiple physical lanes. The system 150 comprises M physical lane interfaces 151, where M>1 and each physical lane interface has an input on line 122 to accept an energy waveform representing a frame at a first data rate divided by M. The physical lane interface may include a receiver, signal communication medium, and buffering. Each physical lane interface 151 has an output on line 152 to supply the frame. Shown are physical lanes 161a and 151n, with outputs 152a and 152n (e.g., M=2). A deframer 154 has an input on lines 152a and 152n to accept the M frames, where each frame includes N/M words of Q bits each word. The deframer 154 detects a frame alignment marker in each frame, and maps the M frames into a single frame of N words. The single frame is mapped into buffer memory 156 having an input on line 158 and an output on line 160.

A encoding module 162 has an input on line 160 to accept the single frame of N words from the buffer memory 156. The encoding module 162 transforms the N words into N transcoded words, which have been encoded with redundant information. The encoding module supplies an energy waveform representing the N transcoded words at an output on line 164, where each transcoded word includes P number of bits, and Q<P. The energy waveform representing N transcoded words is supplied at the first bit rate.

The deframer 154 detects each frame alignment marker as having (N/M)·(Q−P) bits. As explained in detail above, in one aspect the deframer 154 detects each frame alignment marker as an S·(Q−P)-bit word interposed between every Sth word in the frame, see FIGS. 5A through 5C. In some aspects not shown, the deframing and word transformation functions may be performed in a single unit. Additional details and variations have already been described above, and will not be repeated here in the interest of brevity.

Functional Description

The IEEE 802.3ba XLAUI interface is designed to be sent over 4 lanes at 10 G, not 8 lanes at 5 G. The above-described system can be used to insert a unique lane alignment marker in each 5 G lane. The marker provides a reference point to align the lanes. At the end point, the 8 lanes may be re-assembled into a 4 10 G streams by first aligning the markers, recoded into the original format, and then re-interleaving in order.

In 40 G applications based on XLAUI, the above-described system permits each of the four 10 G (10.3125 Gbps) lanes to be disinterleaved into two 5 G (5.15625 Gbps) lanes in such a way that the lanes may be re-interleaved, even in the event of a large amount of skew between the two lanes due the difference in latency between the interleaver and the disinterleaver. In this manner, the systems enable XLAUI interfaces on devices not capable of supporting rates of 10.3125 Gbps. These systems are equally relevant for sending any 10GBASE-R over two half-rate lanes.

The process determines the boundary of the 66-bit word (i.e., 10GBASE-R 64 B/66 B format), if necessary (e.g., at an end point the words will already be aligned to the 66-bit word boundary). The 66-bit words are be compressed by a single bit into 65-bit words using the transcoding technique specified for IEEE 802.3ap-2005 Clause 74 for the Backplane Ethernet forward error correction (FEC) block. This process creates space for the insertion of an alignment frame. The transcoded words can then be disinterleaved to the two half-rate lanes.

On each lane, using one of several possible framing structures, a frame spanning multiple words (e.g., eight) can be created. Having a large frame makes it possible to realign at the end point even with lane skew below half the frame size.

At the far end, the reverse process is performed. First, the start of frame is determined on each lane. Next, the skew offset between the lanes is determined and used to offset the interleaver or to cause the lanes to be aligned in a variable delay buffer. Each transcoded word is converted back to the original 64 B/66 B format. Using the start of frame position, the lanes are re-interleaved by sending a word for one lane, then the other, thus reconstructing the original 10 G stream.

Scenario 1: starting at a MAC device and sending to a separate PHY device via 8 lanes of 5 G.

Device 1 (MAC/PCA)—the MAC layer generates unformatted words and the PCS converts to 64 B/66 B words that are disinterleaved into 4 10 G virtual lanes. Next, the words are transformed into transcoded words by removing redundant information, and each lane is disinterleaved into 2 lanes, creating a total of eight lanes.

Device 2—recovers data on 8 lanes and determines frame sync on each lane. Each pair of lanes is re-interleaved into a single lane and reversed transcoded, creating 4 10 G virtual lanes Scenario 2: receiving at a PHY device input and sending to a MAC/PCS device via 8 lanes of 5 G.

Device 1—a PHY device recovers 4 lanes of 10 G and determines block sync on each lane. The 4 lanes are transcoded and disinterleaved into 8 5 G lanes.

Device 2—recovers data on 8 lanes and determines frame sync on each lane. After aligning each pair of lanes, transcoding is reversed on each of the lanes, and each pair of lanes is re-interleaved to form 4 10 G virtual lanes. Each lane is decoded and sent to the MAC layer.

FIG. 7 is a flowchart illustrating a method for disinterleaving and framing messages in a data streams encoded with redundant information in a communications transmitter. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 accepts an energy waveform representing N words at a first bit rate, encoded with redundant information. Each word includes P number of bits. Step 704 transforms the N words, creating N transcoded words. Each transcoded word includes Q number of bits, where Q<P. Step 706 maps the N transcoded words into M lanes in buffer memory, where M>1 and each lane receives a frame of N/M transcoded words. Step 708 generates a frame alignment marker for each frame. Step 710 maps a frame alignment marker into each frame in the buffer memory. Step 712 transmits energy waveforms representing each frame on a corresponding physical lane at the first bit rate divided by M.

In one aspect, generating the frame alignment marker for each frame in Step 708 includes generating each frame alignment marker with (N/M)·(Q−P) bits. In another aspect, mapping the frame alignment marker into each frame (Step 710) includes mapping the frame alignment marker as an S·(Q−P)-bit word interposed between every Sth word in the frame. The frame alignment marker may be generated as fixed-bit value, a sequence of predefined bit values, or a counting sequence. For example, the frame alignment counting sequence may increment, using a variety of different algorithms, in consecutive frames.

In one aspect, accepting N words at the first bit rate in Step 702 includes accepting N 64 B/66 B encoded words, where P=66. Then, transcoding the N words in Step 704 includes creating N transcoded words, where Q=65. In one particular variation, mapping the N transcoded words into M lanes in Step 706 includes mapping the N transcoded words into 2 lanes (M=2), where each lane receives a frame of N/2 transcoded words. Then, generating the frame alignment marker for each frame (Step 708) includes generating each frame alignment marker with N·(P−Q)/2 bits.

Figure 8:
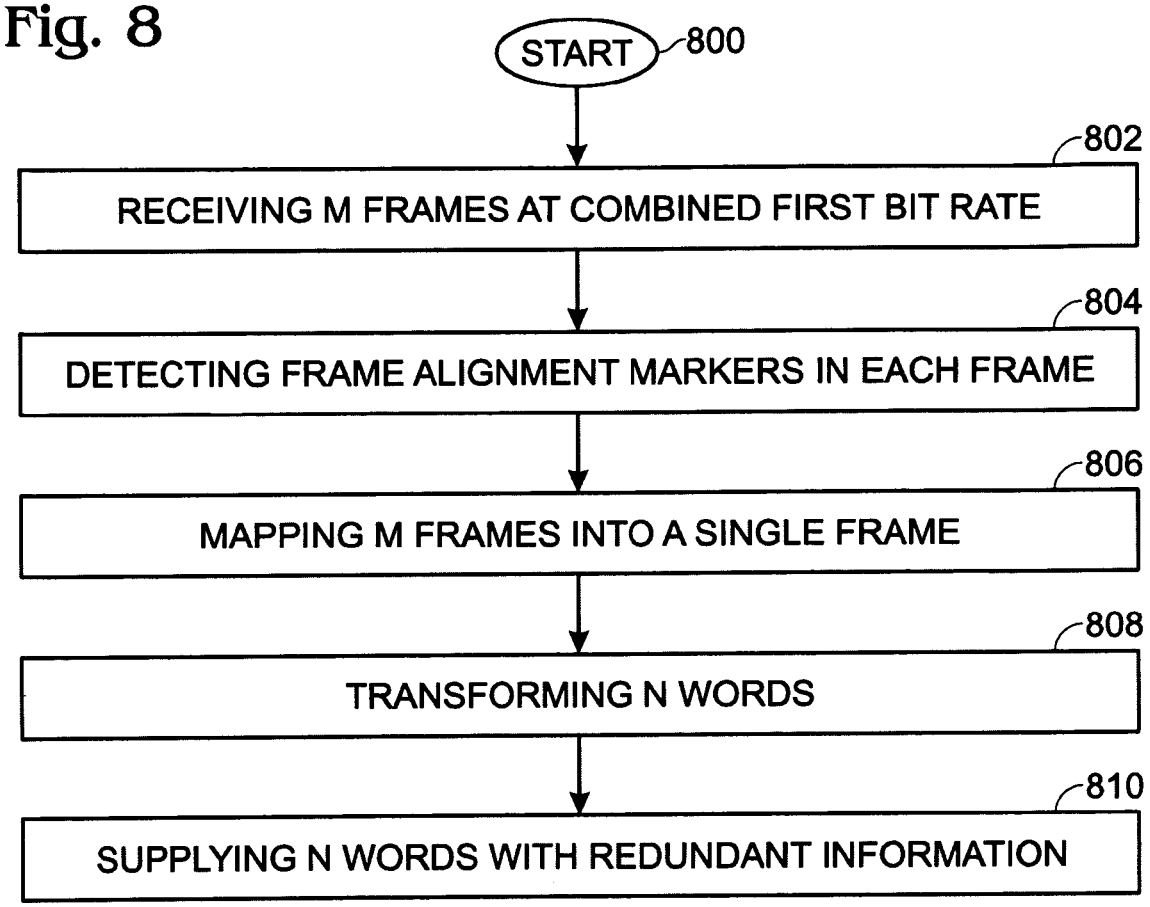
FIG. 8 is a flowchart illustrating a method for re-interleaving messages from multiple physical lanes in a communications receiver.

FIG. 8 is a flowchart illustrating a method for re-interleaving messages from multiple physical lanes in a communications receiver. The method starts at Step 800. Step 802 receives energy waveforms representing M frames, via M corresponding physical lanes at a combined first bit rate, where M>1. Step 804 detects a frame alignment marker in each frame, where each frame includes N/M words of Q bits each. Step 806 maps the M frames into a single frame of N words in a buffer memory. Step 808 transforms the N words into N transcoded words of P bits, where Q<P. Step 810 supplies an energy waveform representing the N transcoded words with redundant encoded information at the first bit rate.

In one aspect, detecting the frame alignment marker in each frame (Step 804) includes detecting a frame alignment marker with (N/M)·(Q−P) bits in each frame. In another aspect, Step 804 detects the frame alignment marker as an S·(Q−P)-bit word interposed between every Sth word in the frame.

Systems and methods have been provided for framing messages initially encoded with redundant information, and recovering the messages at a receiver. The invention has been illustrated in the context of 64 B/66 B words and the IEEE 802.3 ba XLAUI protocol. However, the invention is not limited to merely these examples. The invention has also been illustrated as a process that disinterleaves a lane (frame) into two lanes (frames). However, the invention can be extended to a process that disinterleaves a lane into n lanes, where n is not limited to any particular value. Other variations and embodiments of the invention will occur to those skilled in the art.

I claim:

1. In a communications transmitter, a method for disinterleaving and framing messages in a data stream encoded with redundant information, the method comprising:
    accepting an energy waveform representing N words at a first bit rate, encoded with redundant information, each word including P number of bits;
    transforming the N words, creating N transcoded words, where each transcoded word includes Q number of bits, and where Q<P;
    mapping the N transcoded words into M lanes in a buffer memory, where M>1 and each lane receives a frame of N/M transcoded words;
    generating a frame alignment marker for each frame;
    mapping a frame alignment marker into each frame in the buffer memory; and,
    transmitting energy waveforms representing each frame on a corresponding physical lane at the first bit rate divided by M.

2. The method of claim 1 wherein generating the frame alignment marker for each frame includes generating each frame alignment marker with (N/M)·(Q−P) bits.

3. The method of claim 2 wherein mapping the frame alignment marker into each frame includes mapping the frame alignment marker as an S·(Q−P)-bit word interposed between every Sth word in the frame.

4. The method of claim 1 wherein generating the frame alignment marker for each frame includes generating a frame alignment marker with a pattern selected from a group consisting a fixed-bit value, a sequence of predefined bit values, and a counting sequence.

5. The method of claim 4 wherein generating a frame alignment counting sequence includes generating a frame alignment counting sequence that increments in consecutive frames.

6. The method of claim 1 wherein accepting N words at the first bit rate includes accepting N 64 B/66 B encoded words, where P=66; and,
    wherein transcoding the N words includes creating N transcoded words, where Q=65.

7. The method of claim 1 wherein mapping the N transcoded words into M lanes includes mapping the N transcoded words into 2 lanes (M=2), where each lane receives a frame of N/2 transcoded words; and,
    wherein generating the frame alignment marker for each frame includes generating each frame alignment marker with N·(P−Q)/2 bits.

8. In a communications receiver, a method for re-interleaving messages from multiple physical lanes, the method comprising:
    receiving energy waveforms representing M frames, via M corresponding physical lanes at a combined first bit rate, where M>1;
    detecting a frame alignment marker in each frame, where each frame includes N/M words of Q bits each;
    mapping the M frames into a single frame of N words in a buffer memory;
    transforming the N words into N transcoded words of P bits, where Q<P; and,
    supplying an energy waveform representing the N transcoded words with redundant encoded information at the first bit rate.

9. The method of claim 8 wherein detecting the frame alignment marker in each frame includes detecting a frame alignment marker with (N/M)·(Q−P) bits in each frame.

10. The method of claim 9 wherein detecting the frame alignment marker in each frame includes detecting the frame alignment marker as an S·(Q−P)-bit word interposed between every Sth word in the frame.

11. In a communications network, a system for framing messages in a data streams encoded with redundant information, the system comprising:
    a reduction recoding module having an input to accept an energy waveform representing N words at a first bit rate encoded with redundant information, where each word includes P number of bits, the reduction recoding module transforming the N words and supplying N transcoded words at an output, where each transcoded word includes Q number of bits, where Q<P;
    a framer having an input to accept the N transcoded words, the framer mapping the N transcoded words into M lanes, where M>1 and each lane receives a frame of N/M transcoded words, the framer generating a frame alignment marker for each frame and mapping a frame alignment marker into each frame; and,
    a buffer memory having an input to accept the mapped frames and an output to supply M frames; and,
    M physical lane interfaces, each physical lane interface having an input to accept a frame from the buffer memory, and output to supply an energy waveform representing the frame at the first bit rate divided by M.

12. The system of claim 11 wherein the framer generates each frame alignment marker with (N/M)·(Q−P) bits.

13. The system of claim 12 wherein the framer maps the frame alignment marker as an S·(Q−P)-bit word interposed between every Sth word in the frame.

14. The system of claim 11 wherein the framer generates a frame alignment marker with a pattern selected from a group-consisting a fixed-bit value, a sequence of predefined bit values, and a counting sequence.

15. The system of claim 14 wherein the framer generates a frame alignment counting sequence that increments in consecutive frames.

16. The system of claim 11 wherein the reduction recoding module accepts N 64B/66B encoded words, where P=66, and creates N transcoded words, where Q=65.

17. The system of claim 11 wherein the framer maps the N transcoded words into 2 lanes (M=2), where each lane receives a frame of N/2 transcoded words, and generates each frame alignment marker with N·(P−Q)/2 bits.

18. In a communications network, a system for re-interleaving messages from multiple physical lanes, the system comprising:

M physical lane interfaces, where M>1 and each physical lane interface has an input to accept an energy waveform representing a frame at a first data rate divided by M, and an output to supply the frame;

a deframer having an input to accept the M frames from the first buffer memory, where each frame includes N/M words of Q bits each word, the deframer detecting a frame alignment marker in each frame, and mapping the M frames into a single frame of N words, in a first buffer memory;

a buffer memory to buffer the mapped single frame; and, a encoding module having an input to accept the single frame of N words from the buffer memory, the encoding module transforming the N words into N transcoded words encoded with redundant information, and supplying an energy waveform representing the N transcoded words at the first bit rate, where each transcoded word includes P number of bits, and Q<P.

19. The system of claim 18 wherein the deframer detects each frame alignment marker with (N/M)·(Q−P) bits.

20. The system of claim 19 wherein the deframer detects each frame alignment marker as an S·(Q−P)-bit word interposed between every Sth word in the frame.

* * * * *